United States Patent
Fujisaki et al.

[11] Patent Number: 5,835,633
[45] Date of Patent: Nov. 10, 1998

[54] CONCURRENT TWO-STAGE MULTI-NETWORK OPTICAL CHARACTER RECOGNITION SYSTEM

[75] Inventors: Tetsunosuke Fujisaki, Armonk, N.Y.; Jianchang Mao, Campbell; Kottappuram Mohamedali Mohiuddin, San Jose, both of Calif.

[73] Assignee: International Business Machines Corporation, Armonk, N.Y.

[21] Appl. No.: 561,509

[22] Filed: Nov. 20, 1995

[51] Int. Cl.$^6$ .............................. G06K 9/00; G06K 9/62
[52] U.S. Cl. ...................... 382/187; 382/159; 382/224; 382/156
[58] Field of Search ................... 382/227, 187, 382/224, 159, 155, 156

[56] References Cited

U.S. PATENT DOCUMENTS

| | | | |
|---|---|---|---|
| 4,180,779 | 12/1979 | Hook et al. | 329/50 |
| 4,958,377 | 9/1990 | Takahashi | 382/34 |
| 5,020,117 | 5/1991 | Ooi et al. | 382/46 |
| 5,052,043 | 9/1991 | Gaborski | 382/14 |
| 5,150,424 | 9/1992 | Asuro | 382/187 |
| 5,166,539 | 11/1992 | Uchimura et al. | 307/201 |
| 5,195,169 | 3/1993 | Kamiya et al. | 395/23 |
| 5,212,767 | 5/1993 | Higashino et al. | 395/27 |
| 5,214,717 | 5/1993 | Kimura et al. | 382/21 |
| 5,237,661 | 8/1993 | Kawamura et al. | 395/250 |
| 5,239,594 | 8/1993 | Yoda | 382/15 |
| 5,239,619 | 8/1993 | Takatori et al. | 395/23 |
| 5,248,873 | 9/1993 | Allen et al. | 250/208 |
| 5,257,342 | 10/1993 | Takatori et al. | 395/23 |
| 5,276,771 | 1/1994 | Manukian et al. | 395/24 |
| 5,303,311 | 4/1994 | Epting et al. | 382/10 |
| 5,327,522 | 7/1994 | Furuta et al. | 395/27 |
| 5,361,311 | 11/1994 | Wilson | 382/32 |
| 5,361,379 | 11/1994 | White | 382/224 |
| 5,544,264 | 8/1996 | Bellegarda et al. | 382/188 |
| 5,596,657 | 1/1997 | Choi | 382/227 |

FOREIGN PATENT DOCUMENTS 0 555 023 A2  8/1993  European Pat. Off. .......... G06K 9/68

OTHER PUBLICATIONS

Fujisaki, et al., U.S. application No. 08/061,495, "Hybrid On–Line Handwriting Recognition And Optical Character Recognition System".

T. Mano, et al., "Automatic Character Image Sanitizing Method for Optical Character Recognition Data Setup", IBM Technical Disclosure Bulletin, vol. 37, No. 11, Nov. 1994, p. 277.

(List continued on next page.)

*Primary Examiner*—Jose L. Couso
*Assistant Examiner*—Matthew C. Bella
*Attorney, Agent, or Firm*—Gary Cary Ware Freidenrich

[57] ABSTRACT

A multi-stage multi-network character recognition system decomposes the estimation of a posteriori probabilities into coarse-to-fine stages. Classification is then based on the estimated a posteriori probabilities. This classification process is especially suitable for the tasks that involve a large number of categories. The multi-network system is implemented in two stages: a soft pre-classifier and a bank of multiple specialized networks. The pre-classifier performs coarse evaluation of the input character, developing different probabilities that the input character falls into different predefined character groups. The bank of specialized networks, each corresponding to a single group of characters, performs fine evaluation of the input character, where each develops different probabilities that the input character represents each character in that specialized network's respective predefined character group. A network selector is employed to increase the system's efficiency by selectively invoking certain specialized networks selected, using a combination of prior external information and outputs of the pre-classifier. Relative to known single network or one-stage multiple network recognition systems, the invention provides improved recognition, accuracy, confidence measure, speed, and flexibility.

43 Claims, 7 Drawing Sheets

OTHER PUBLICATIONS

T. Mano, et al., "Hybrid Optical Character Recognition System with Neural Network and Template Matching Recognition Methods", IBM Technical Disclosure Bulletin, vol. 37, No. 11, Nov. 1994, p. 275.

A. R. Rawson, "Application of Artificial Neural Networks to Fixed–Font Character Recognition", IBM Technical Disclosure Bulletin, vol. 34, No. 4A, Sep. 1991, pp. 469–472.

J. L. Huerta, "Anchor/Leveling Device for RISC 60000/ Systems", IBM Technical Disclosure Bulletin, vol. 36, No. 12, Dec. 1993, p. 347.

E. Bellegarda, et al., "Fully Automatic Corpus Annotation Handwriting Recognition", IBM Technical Disclosure Bulletin, vol. 36, No. 12, Dec. 1993, pp. 343–345.

M.S. Narasimha, et al., "Partitioned Class Recognition By Computational Neural Network", IBM Technical Disclosure Bulletin, vol. 37, No. 11, Nov. 1994, pp. 7–9.

E. J. Bellegarda, et al., "Front–end Paradigm for On–Line Handwriting Recognition", IBM Technical Disclosure Bulletin, vol. 37, No. 02A, Feb. 1994, pp. 345–348.

R. T. Chien, et al., "Multilevel Adaptive Decision Techniques", IBM Technical Disclosure Bulletin, vol. 8, No. 4, Sep. 1965, pp. 580–582.

A. Takimoto, "An Optical Neuron Device Capable of Optical Parallel Operations and All–Optical Neural Networks", Electronics and Communications in Japan, Part 2, vol. 76, No. 10, 1993, pp. 1–9.

W. Robinson, et al., "Character Recognition Using Novel Optoelectronic Neural Network", SPIE, vol. 1902, Nonlinear Image Processing IV (1993), pp. 305–317.

T. Marek, "Analysis of Parallel Implementations of an Artificial Neural Network on SIMD Systems", SPIE, vol. 1709 Applications of Artificial Neural Networks III (1992), pp. 664–676.

H. Takahashi, "Neural Network Architectures for Rotated Character Recognition", 11th IAPR International Conference on Pattern Recognition, vol. II, Conference B: Pattern Recognition Methodology and Systems, The Hague, Netherlands, Aug. 30–Sep. 3, 1992, IEEE 1992, pp. 623–626.

B. Boser, "An Analog Neural Network Processor and Its Application to High–Speed Character Recognition", pp. I–415 –I–420, International Joint Conference on Neural Networks, vol. I, Jul. 8–12, 1991, Seattle, WA.

Y. Kimura, "Distorted Handwritten Kanji Character Pattern Recognition by a Learning Algorithm Minimizing Output Variation", pp. I–103 –I–106, International Joint Conference on Neural Networks, vol. I, Jul. 8–12, 1991, Seattle, WA.

B. White, "The Digi–Neocognitron: A Digital Neocognitron Neural Network Model for VLSI", IEEE Transactions on Neural Networks, Jan. 1992, vol. 3, No. 1, pp. 73–85.

D. Choi, "High Speed Character Recognition by Multiprocessor System", Journal of The Korean Institute of Telematics and Electronics, vol. 30–B, No. 2, Feb. 1993. (Korean – partial English language translation only).

W. You–shou, et al. "An Experimental System of Printed Chinese Character Recognition", Acta Electronica Sinica (China), vol. 15, No. 5, pp. 1–7. (Chinese –partial English language translation only).

K. Wong, et al., "Document Analysis System", 6th International Conference on Pattern Recognition, vol. I, IEEE 1992, pp. 496–500.

G. Dimauro, et al., "Integration of a Structural Features–Based Preclassifier and a Man–Machine Interactive Classifier for a Fast Multi–Stroke Character Recognition", 11th IAPR International Conference D: Architectures for Vision and Pattern Recognition, IEEE 1992, pp. 190–194.

M.D. Richard, et al, "Neural Network Classifiers Estimate Bayesian Posteriori Probabilities", Neural Computation, 3:461–483 (1991).

H. Takahaski, "A Neural Net OCR Using Geometrical and Zonal–Pattern Features", Proceedings of 1st International Conference on Document Analysis and Recognition, pp. 821–828 (1991).

R.G. Casey, et al., "Experience in Segmenting and Classifying the Nist Data Base", Proceedings of International Workshop on Frontiers of Handwriting (1991), pp. 1–15.

D.E. Rumelhart, et al., "Parallel Distributed Processing: Exploration in the Microstructure of Cognition", vol. 1–2, M.I.T. Press (1986), pp. 319–362.

R.A. Wilkinson, et al., "The First Census Optical Character Recognition System Conference", U.S. Department of Commerce, NISTIR 4912 (1992).

CONCURRENT TWO-STAGE MULTI-NETWORK OPTICAL CHARACTER RECOGNITION SYSTEM

BACKGROUND OF THE INVENTION

1. Field of the Invention

The present invention relates to optical character recognition ("OCR") systems and, more particularly, to a two-stage multi-network OCR system including a soft pre-classifier network to evaluate input characters in regard to certain groups of recognized characters, a bank of specialized neural networks to evaluate input characters in relation to categories of characters within a particular group, a network selector to selectively invoke the specialized networks based on the outputs of the pre-classifier and certain external information, and a candidate selector to provide a ranked output of proposed target characters.

2. Description of the Related Art

Multilayer feedforward networks have been successfully used for character recognition in a number of known applications. One such application is in OCR systems. In some applications, the character set to be recognized (the "target character set") can be determined beforehand. One such application, for example, is zip code recognition, where the target character set is limited to the ten digits, 0 through 9. In these applications, a specialized network can be designed to specifically perform this task. Generally, the more specific training applied to a network, the better the network performs for that specific task in terms of accuracy, and the like.

However, it may be difficult to a priori confine the target character set to a small set in some applications. Consider, for example, recognizing a page of general text. In this case, two approaches are typically used. A "single-network" approach involves designing a single large feedforward network with a sufficient number of output units to cover all possible target characters. In contrast, a single-stage "multi-network" approach uses a number of specialized sub-networks, each trained to recognize a subset of characters, and selects winning characters from among the specialized sub-networks.

The single-network and single-stage multi-network approaches have certain respective advantages and drawbacks. For some users, neither the single-stage multi-network nor the single-network system provides a satisfactory balance between recognition accuracy, coverage in top choices, confidence, speed, and flexibility.

The following comparison explores the advantages and disadvantages of single-network and single-stage multi-network systems in greater detail. Although this comparison is based on a single-stage multi-network system that uses four networks specialized in recognizing upper-case, lower-case, digit, and special symbol partitions, respectively, these properties are generally true for other partitions of the whole target character set.

1. Recognition Accuracy, Confidence, and Coverage in Top Choices

The single-network approach generally provides a higher recognition accuracy than the single-stage multi-network approach in situations where no "external" information is provided, i.e. where no external data is provided specifically to distinguish between upper-case characters, lower-case characters, digits, and special symbols. For some non-lower-case characters, the lower-case sub-network of a single-stage multi-network system may generate unjustifiably large output values, relative to other sub-networks. In an attempt to overcome this problem, the outputs of the lower-case sub-network may be scaled down after a set of top candidates is selected. Because this type of scaling is non-adaptive (i.e., independent of the input character), it degrades the accuracy of recognizing lower-case characters, even for those lower-case characters that are well distinguished from upper-case characters and digits, e.g. a well-written "a", "d", or "e".

Moreover, it may be difficult to use outputs of the "pooled" specialized sub-networks as a confidence measure for rejecting target characters and performing post-processing steps such as contextual processing. On the other hand, if a specialized sub-network in a multi-network system can be selected based on external information regarding input characters, then the multi-network approach offers a higher recognition accuracy and more meaningful confidence measure than the single-network approach.

In situations with or without external information, the multi-network system usually yields a higher coverage rate in top choices than the single-network approach.

2. Recognition Speed

"Size" in a neural network may be defined as the number of weights in the network. The size of a single-network is usually larger than an individual specialized sub-network, but smaller than all the specialized networks combined. Recognition speed depends on how many specialized sub-networks are being invoked, as well as the availability of external case information. If the input character's case is unknown, the single-network system is faster than the single stage multi-network system; this situation is reversed, however, if exterior case information is available to uniquely determine which specialized network to use.

3. Flexibility

In most applications, multi-network architectures are more flexible than single-network architectures. One example is data form processing, where most field types of the form are usually known in advance. This enables different specialized networks to be invoked for different fields. Furthermore, a multi-network architectures can more easily be trained to a new application, because the training of specialized networks is considerably easier than single-networks.

For some users, then, performance of the known multi-network and single-network character recognition architectures may fail to provide a satisfactory balance between recognition accuracy, confidence, speed, and flexibility.

SUMMARY OF THE INVENTION

Broadly, the invention involves a character recognition system implementing a two-stage multi-network classification architecture. This system generally receives an input character and provides a ranked list of "target" output characters that the input character is most likely to represent.

The input character may be embodied as a form on some tangible medium, for example. This input character is detected by a transducer, which produces an output matrix, such as a bitmap, representative of the character. A feature extractor extracts features from the transducer's matrix, and generates an output representative of various specific features of the input character.

The feature extractor's output is fed to a "soft" pre-classifier network as well as a group of multiple specialized networks. Each of these networks may comprise, for example, feedforward neural networks. The soft pre-classifier network performs "coarse" evaluation of the input character, while the specialized networks conduct "fine"

evaluation of the input character. Particularly, the pre-classifier network develops different probabilities that the input character falls into different predefined "groups" (also called "partitions" or "subsets") of characters. Four pre-defined groups of characters, for example, may comprise (1) upper-case alphabetic letters, (2) lower-case alphabetic letters, (3) numerical digits, and (4) special symbols such as "&" or "*".

In contrast to the pre-classifier, each specialized network corresponds exclusively to a single group of characters. In performing its "fine" evaluation, a specialized network determines probabilities that the input character represents different predefined target characters of the specialized network's respective group. For instance, if a specialized network corresponds to a group comprising lower-case characters, the network develops probabilities that the input character corresponds to the members of its group, e.g., "a", "b", "c", etc.

The members of a group are called "categories", and may relate to members of another group. For instance, in the case of the lower and upper-case groups, both groups include a category corresponding to the first letter of the alphabet: "a" in the case of the lower-case group, and "A" in the case of the upper-case group. In the case of the digit group, the categories include "1", "2", "3", and so on.

Thus, the pre-classifier network and specialized networks provide weighted outputs representing probabilities that the input character is a member of various groups and categories, respectively. These outputs are combined by a multiplier, which effectively weights the specialized networks' outputs in accordance with the pre-classifier's output. These weighted outputs are then directed to a candidate selector, which assembles and orders the multiplier's outputs. The candidate selector may also limit the output to a preselected collection of categories, such as the top ten most likely target characters.

In addition to the pre-classifier network and the specialized networks, a network selector may be provided to disable one or more of the specialized networks whose groups are found by the pre-classifier to be especially unlikely. This boosts the overall efficiency of the systems, since the target characters with the highest likelihoods will originate from specialized networks also found by the pre-classifier to be most likely.

The invention affords a number of distinct advantages. For example, the invention overcomes the disadvantages of single-stage multi-network designs, while retaining their advantages when exterior group information is available. Compared with known single-network and single-stage multi-network systems, the present invention improves recognition accuracy, confidence measure, coverage rate, speed, and flexibility.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

GENERAL TWO-STAGE MULTI-NETWORK CLASSIFICATION SYSTEM

Figure 1:
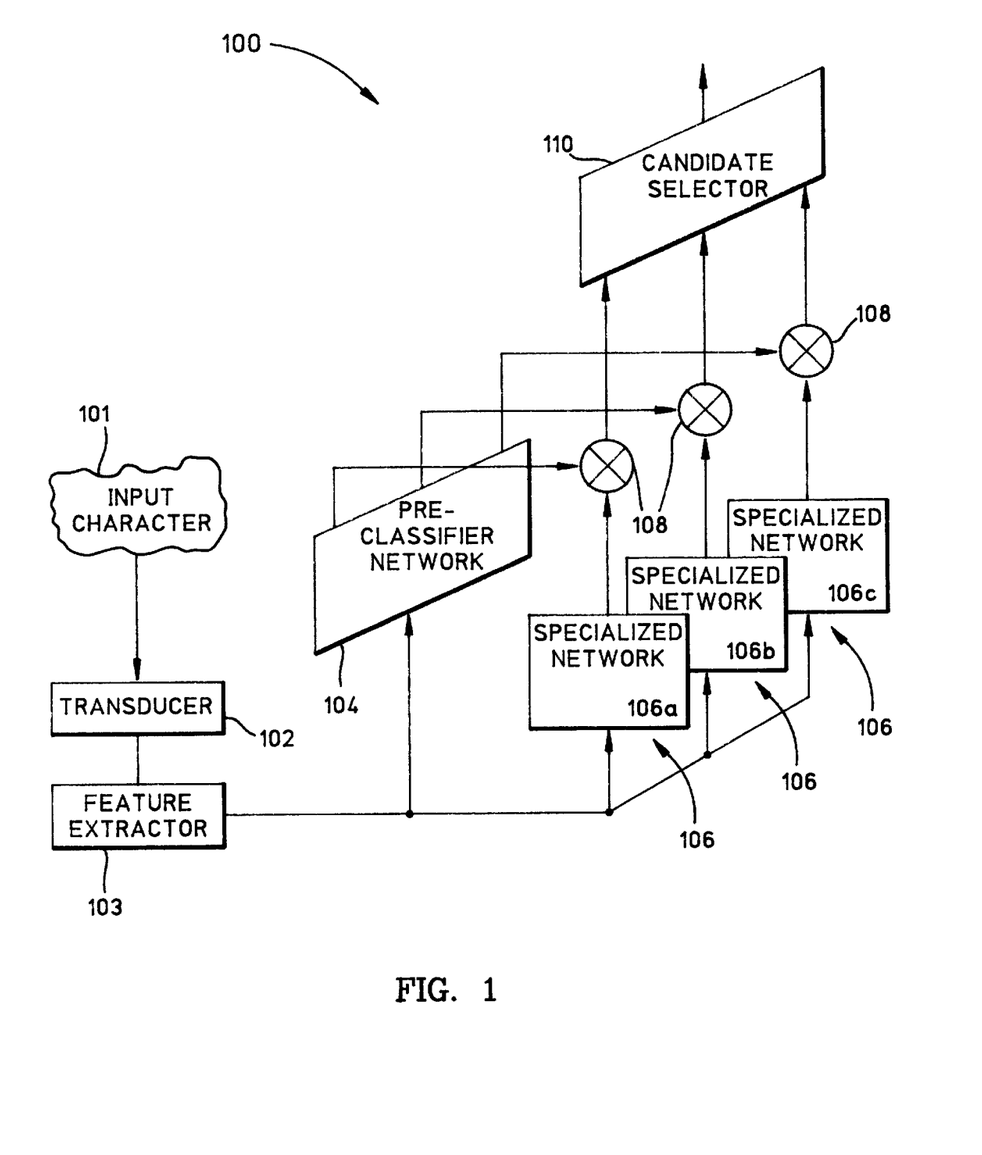
FIG. 1 is a block diagram of an exemplary two-stage multi-network character recognition system, pursuant to the invention.

FIG. 1 generally illustrates one exemplary implementation of the invention, in the form of a two-stage multi-network character recognition system 100. The system 100 includes a number of different components, explained as follows.

Transducer

The system 100 includes a transducer 102 to receive an input character 101. As an example, the input character may be selected from an input set comprising the characters available on a standard English language typewriter or computer keyboard. The input character is preferably provided via a tangible medium, such as a character that is imprinted by type, hand, or computer on paper. The transducer 102 comprises a mechanism appropriate to generate an electrical matrix signal representative of the character's appearance. The transducer 102, for example, may comprise an optical scanner, or another device as discussed in greater detail below. The matrix, for example, may comprise a two-dimensional binary bit map with ones and zeros representing the black and white pixels of the input character, as discussed in greater detail below.

Feature Extractor

The transducer's matrix is directed to a feature extractor 103. The feature extractor 103, the operation of which is described in greater detail below, uses the matrix to create a feature vector containing representations of different characteristics of the input character. The extracted feature may include, for example, contour direction features and bending point features.

Networks Generally

The feature extractor's output is fed to a soft pre-classifier network 104 as well as a group of multiple specialized networks 106. These networks 104/106 may comprise, for example, feedforward neural networks, each including an input stage, a number of hidden layers, and an output layer of nodes. Preferably, these nodes are successively connected, either fully or locally, in a feedforward fashion, such that no connections exist between nodes in the same layer and no feedback connections exist between layers. The construction of the networks 104/106 is described in greater detail below.

Broadly, the networks 104 and 106 serve to determine the probability that the input character is a member of various groups and categories. More specifically, the soft pre-classifier network 104 performs "coarse" evaluation of the input character, while the specialized networks 106 conduct "fine" evaluation of the input character. The pre-classifier network 104 calculates probabilities that the input character falls into different predefined "groups" (also called "partitions" or "subsets") of characters. For example, the groups may be predefined to establish four exemplary groups of characters comprising: (1) upper-case alphabetic letters, (2) lower-case alphabetic letters, (3) numerical digits, and (4) special symbols such as "&" or "*". The partitions may be established, for example, using a clustering algorithm or another suitable approach, and may be overlapping or non-overlapping, depending upon the user's preference.

In contrast to the pre-classifier network 104, each specialized network 106 corresponds to a single, respective group of characters. In performing its "fine" evaluation, an individual one of the specialized networks 106 determines probabilities that the input character represents different predefined target characters in the specialized network's respective group. For instance, in an exemplary specialized network corresponding to a group comprising lower-case characters, probabilities would be developed that the input character corresponds to the members of its group, i.e., "a", "b", "c", etc.

The members of a group are called "categories", and may relate to members of another group. For instance, in the case of the lower and upper-case groups, both groups include a category corresponding to the first letter of the alphabet: "a" in the case of the lower-case group, and "A" in the case of the upper-case group.

Thus, the pre-classifier network 104 and specialized networks 106 provide weighted outputs representing probabilities that the input character is a member of various groups or categories.

Pre-Classifier

In response to the feature extractor's representation of the input character, the pre-classifier network 104 provides a "coarse" output signal. The coarse output signal comprises a coarse vector individually evaluating the probabilities that the input character belongs to different groups of "target" characters. The target character groups, for example, may be organized into groups as shown in Table 1, below.

TABLE 1

Character Groups

GROUP TARGET CHARACTERS 1  upper-case characters, e.g., "A", etc.
2  lower-case characters, e.g., "a", etc.
3  digits, e.g., 0, 1, 2, 3, 4, etc.
4  special symbols, such as the following 16 symbols, e.g., !, #, $, %, *, (,), -, +, <, >, ", :, ;, /, =, ?, etc.

In the example of FIG. 1 and Table 1, then, the pre-classifier network 104 receives the feature extractor's representation of the input character, and provides an output signal comprising a coarse vector individually estimating the probability that the input character belongs to the target characters of groups 1, 2, 3, and 4.

Specialized Networks

Each specialized network 106 also receives the feature extractor's representation of the input character. Each specialized network 106 pertains to a specific group of characters, each of which may or may not overlap with character groups of the other specialized networks, depending upon the user's preference. Each specialized network serves to provide a "fine" output signal comprising a fine vector that evaluates the probabilities of the input character representing each category of characters in that specialized network's particular group of characters.

Network Theory & Implementation

Some additional discussion is helpful in understanding the implementation of the networks 104 and 106. Particularly, the coarse and fine evaluation functions of the networks 104 and 106 may be represented using probabilistic and statistical equations.

Given an input character, $\psi$, the a posteriori probabilities that the input character corresponds to any given character category can be estimated, as follows:

$$Prob(\omega_i|\psi) = \sum_{j=1}^{c} Prob(\omega_i|\Omega_j,\psi) Prob(\Omega_j|\psi), i = 1, 2, \ldots, n. \quad [1]$$

where:

$Prob(\Omega_j|\psi)$ is the a posteriori probability of the input character belonging to the group $\Omega_j$, i.e., $Prob(\Omega_j|\psi) = Prob(\psi \in \Omega_j|\psi)$;

$Prob(\omega_i|\Omega_j,\psi)$ is the probability of the input character, having known $\psi \in \Omega_j$, being the category $\omega$;

$\Omega = \{\omega_i | i=1, 2, \ldots, n\}$ is the whole target character set divisible into c groups (subsets), such as numbers, letters and special characters, $\Omega_i$, i =1, 2, ..., c; $\omega_i$ is a character category (e.g., "a"); and n is the total number of possible characters in a given application domain, and $\Omega = \cup_{i=1}^{c} \Omega_i$.

$Prob(\Omega_j|\psi)$ and $Prob(\omega_i|\Omega_j,\psi)$ are referred to as the "coarse" and "fine" a posteriori probabilities, respectively. When the partitions are non-overlapping, i.e., $\Omega_i \cap \Omega_j = \emptyset$, $\forall i \neq j$, Equation 1 can be expressed as shown in Equation 2, below.

$$Prob(\omega_i|\psi)=Prob(\omega_i|\Omega_k,\psi)Prob(\Omega_k|\psi), i=1,2,\ldots,n, \quad [2]$$

where: $\omega_i \in \Omega_k$.

Equations 1 and 2 indicate that in one embodiment, a posteriori probability can be computed in two steps in a coarse-to-fine fashion: first estimating the probability of the input pattern being in a group; then, estimating the a posteriori probability within this group.

Once these a posteriori probabilities are obtained, the optimal classification rule that minimizes the classification error is simply to assign the input character to the category $\omega_k$, such that its a posteriori probability is maximized.

To estimate a posteriori probabilities, a number of networks are known, e.g., multilayer perceptron with sigmoidal nonlinearities, radial basis function networks, and high-order polynomial networks, trained using the squared-error, cross-entropy, and normalized-likelihood cost functions. See e.g., M.D. Richard and R.P. Lippmann, Neural Network Classifiers Estimate Bayesian a posteriori Probabilities, Neural Computation, 3:461–483 (1991). The estimation accuracy depends on the network complexity, the amount of training data, the degree to which training data reflect the true class-conditional densities and a priori probabilities.

According to these analyses, the soft pre-classifier network 104 is constructed of target characters for assigning the membership of the input character to some group, comprising a feedforward network with c output units configured for estimating the coarse a posteriori probabilities. The coarse evaluation is shown by Equation 3, below.

$$\text{coarse evaluation} = Prob(\Omega|\psi) \quad [3]$$

A separate specialized network can be trained for each group to estimate the fine a posteriori probabilities; these networks are the specialized networks 106. The fine evaluation is shown by Equation 4, below.

$$\text{fine evaluation} = Prob(\omega_i|\Omega,\psi) \quad [4]$$

Accordingly, the coarse evaluation of Equation 3 is performed by the soft pre-classifier 104, whereas the fine evaluations in accordance with Equation 4 are performed by each of the various specialized networks 106.

Multiplier

A multiplier 108 is coupled both to the pre-classifier network 104 and the specialized networks 106. The multiplier 108 generally serves to modify each specialized network's output pursuant to the pre-classifier's output. More particularly, the multiplier 108 weights each specialized network's fine vector in proportion to the corresponding pre-classifier's coarse vector components, thereby providing multiplier output lists each comprising an estimate of individual probabilities that the input character corresponds to characters of a different specialized network. As suggested in FIG. 1, the multiplier 108 may comprise discrete components, one for each specialized network. Alternatively, the architecture of the multiplier 108 may comprise a single high-speed stage with input queuing.

Candidate Selector

The system 100 also includes a candidate selector 110, coupled to the multiplier 108. The candidate selector 110 assembles and ranks contents of the multiplier output lists. The candidate selector 110 may also limit the output to a preselected group, such as the top ten most likely target characters. The output of the candidate selector 110 includes a list of target characters and associated "confidence values," indicating the estimated probabilities that each target character correctly corresponds to the input character.

TWO-STAGE MULTI-NETWORK OCR SYSTEM

Figure 2:
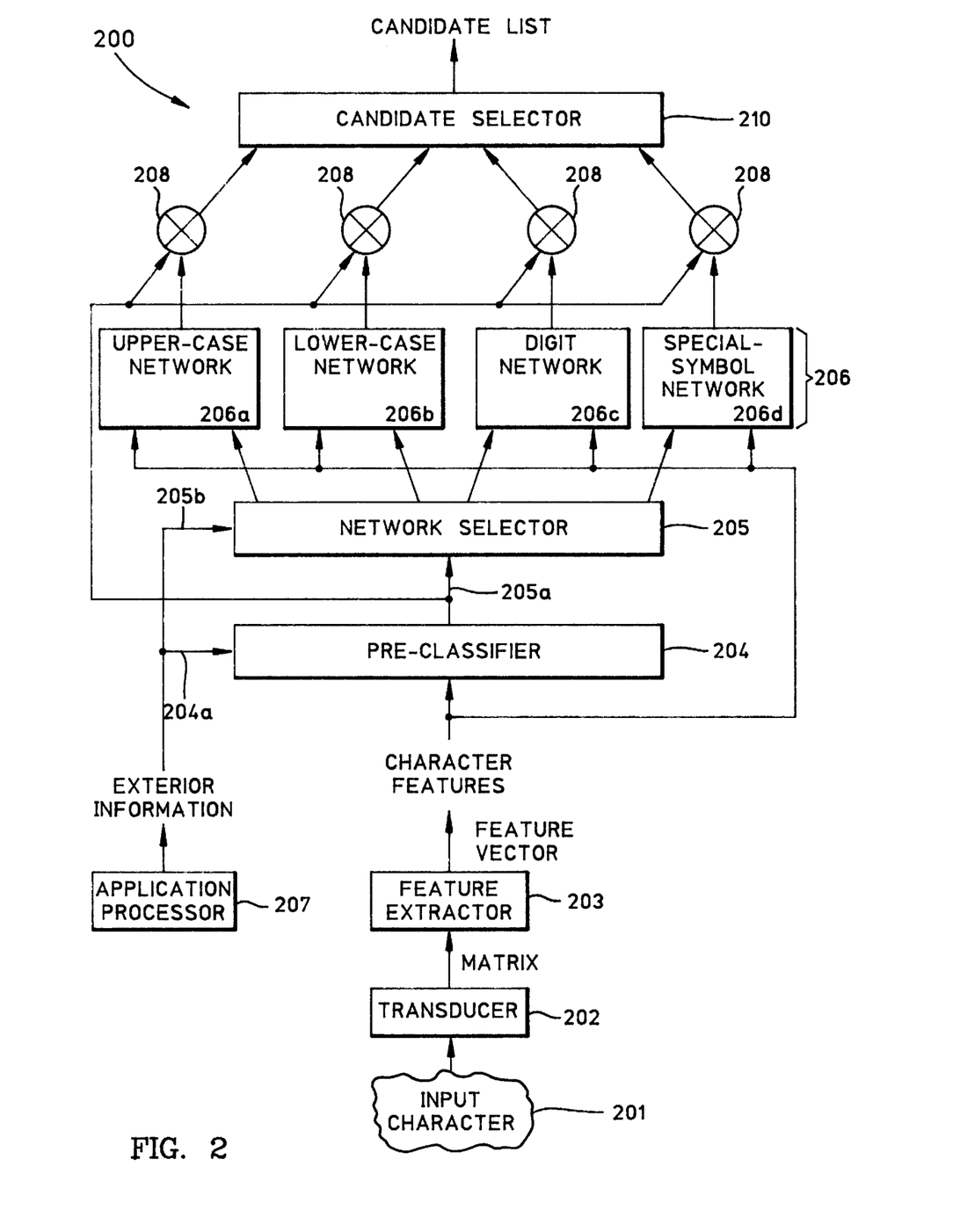
FIG. 2 is a more detailed block diagram of an exemplary two-stage multi-network OCR system, pursuant to the invention.

FIG. 2 illustrates a specific implementation of a multi-network character recognition system 200, designed to recognize characters input by optical means. The system 200 includes a number of different hardware components, many similar to the system 100 (FIG. 1), as described below.

Transducer

Like the system 100 (FIG. 1), the system 200 includes a transducer 202 to receive an input character 201. As in FIG. 1, the input character may be selected from an input set comprising the characters available on a standard English language typewriter or computer keyboard, for example. In the illustrated embodiment, the whole character set is partitioned into groups as shown in Table 1 (above).

In an exemplary embodiment, input characters may be formed on one or more sheets of paper, where the transducer 202 comprises a digital optical scanner, providing a digital matrix representative of each input character's "bit map". As another example, a user may provide input characters by handwriting characters upon a pressure-sensitive digitizing pad, such as an IBM ThinkWrite and Pen for OS/2® product. Alternatively, a digitized character may be received from another source, such as a stored data file or a separate computer.

The transducer 202 provides a binary matrix comprising a two-dimensional binary bit map with ones and zeros representing the black and white pixels of the input character. The size of the matrix may be dynamically determined, for example, in response to the physical size of the input character. For instance, if the transducer digitizes at 300 dots per inch, the matrix may comprise a 60×40 element binary array.

Feature Extractor

The transducer's matrix is directed to a feature extractor 203, which creates a feature vector containing representations of different characteristics of the input character. In an exemplary embodiment, the feature extractor 203 may normalize the transducer's matrix to a uniform size, such as an array of 24×16 elements. The feature extractor 203 preferably processes the matrix as described by H. Takahashi, in *A Neural Net OCR Using Geometrical and Zonal-Pattern Features*, Proceedings of 1st International Conference on Document Analysis and Recognition, pp. 821–828 (1991); the contents of this reference being incorporated herein by reference. In the illustrated embodiment, the feature extractor 203 recognizes 184 features, divisible into two types: (1) 88 contour direction features, which are generated by dividing the image array into rectangular and diagonal zones and computing the histograms of chain codes in these zones, and (2) 96 bending point features, which represent high curvature points, terminal points, and fork points. In the feature extractor 203, or alternatively in the transducer 202, character images are normalized to a size of 24 height units by 16 width units to reduce the character size variation.

Networks

1. Generally

The feature extractor 203 is coupled to a number of different networks, including a pre-classifier 204 and multiple specialized networks 206. The specialized networks 206 preferably include an upper-case network 206a, a lower-case network 206b, a digit network 206c, and a special-symbol network 206d.

Like the system 100 (FIG. 1), the networks 204 and 206 evaluate the probabilities that the input character corresponds to various groups or categories. Preferably, the networks 204 and 206 are implemented to perform coarse and fine evaluation, in accordance with Equations 3–4 discussed above.

2. Details of Network Structure

As with the system 100 (FIG. 1), each individual network 204/206 preferably comprises a feedforward network, including a number of individual "units" or "nodes," organized into the following layers: an input layer, a layer of hidden units, and an output layer. All units are successively connected, either fully or locally, in a feedforward fashion where no connections exist between nodes in the same layer and no feedback connections exist between layers.

Figure 3:
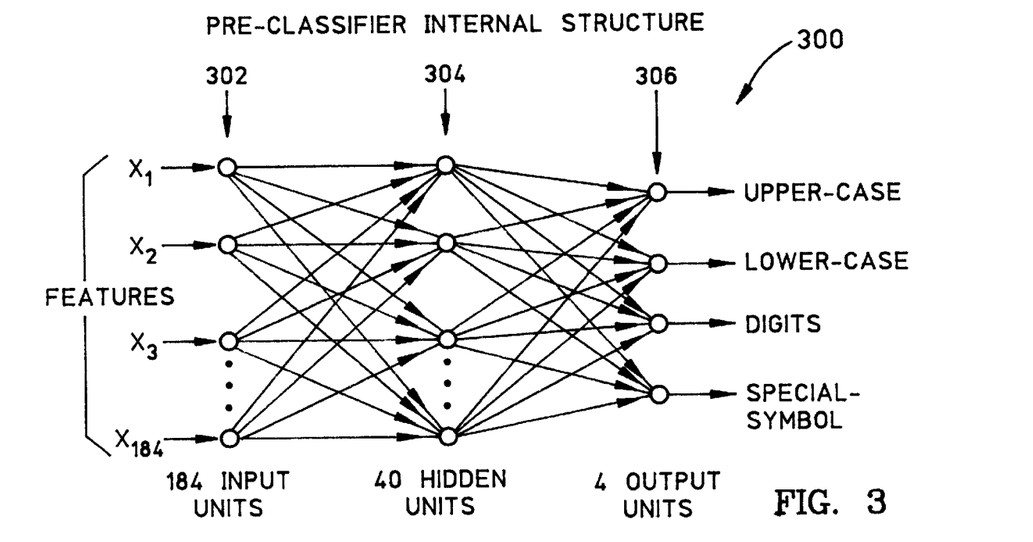
FIG. 3 is a network diagram of the internal structure of a pre-classifier, pursuant to the invention.

More specifically, as shown in FIG. 3, the pre-classifier 204 has an internal structure 300 that includes 184 input units 302 for receiving the 184 input features from the feature extractor 203. The pre-classifier 204 further includes 40 hidden units 304 and four output units 306. Each output unit 306 corresponds to a different one of the groups of Table 1.

Figure 4:
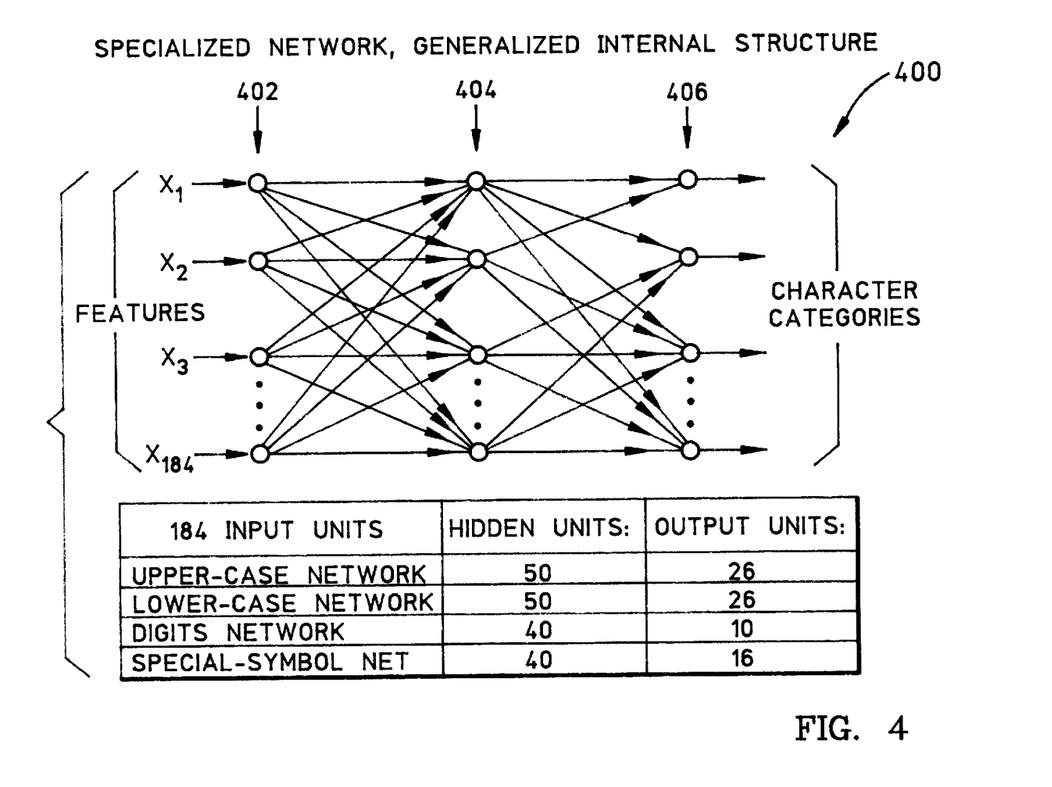
FIG. 4 is a generalized network diagram of the internal structure of a specialized network, pursuant to the invention.

Similarly, as shown in FIG. 4, each specialized network 206 has an internal structure 400 that includes various numbers of input units 402, hidden units 404, and output units 406. As in the structure 300 (FIG. 3), each network 206 includes 184 input units 402. However, the number of hidden 404 and output units 406 varies network-by-network, depending upon the character group associated with that network. Namely, the upper and lower-case networks 206a–206b each include 50 hidden units 404 and 26 output units 406; in contrast, the digit network 206c includes 40 hidden units 404 and ten output units 406, and the special symbol network 206d includes 40 hidden units 404 and 16 output units 406.

Figure 5:
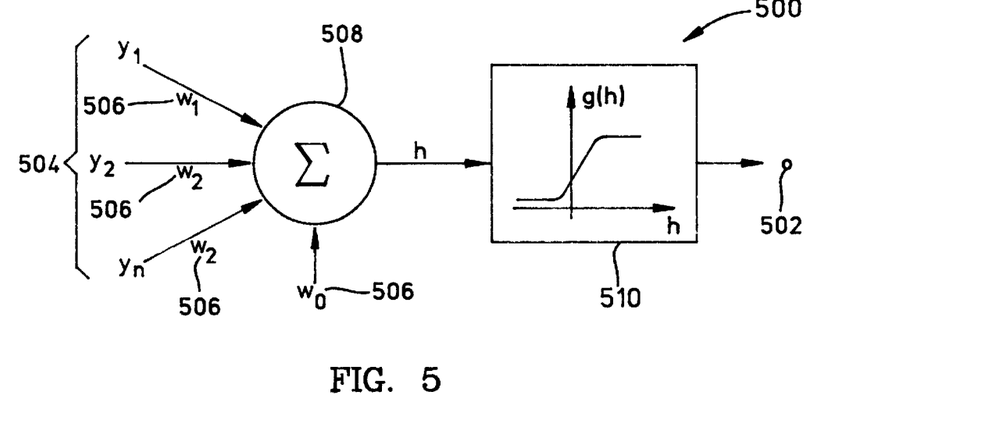
FIG. 5 is a diagram illustrating the operation of a network unit in greater detail, pursuant to the invention.

FIG. 5 illustrates in greater detail the structure and function of an exemplary "unit" 500 that typifies the units of the networks of FIGS. 3–4. Generally, each unit 500 serves to provide an output signal 502 based upon a number of input signals 504. The input signals 504 are first combined by applying certain weights 506, preferably accomplished using a linear summation as shown in Equation 5 (below).

$$h = \sum_{i=1}^{n} w_i y_i + w_0 \quad [5]$$

where:

y1, y2 ... yn are the input signals 504;

w1, w2 ... wn and w0 are the weights 506; and h is the linear summation.

In FIG. 5, the linear summation operation is depicted by the summation circle 508. The weights 506 may be established using a known scheme for "learning" or "training" weights in a neural network. This training, for example, may be performed by one skilled in the art by implementing or adapting known methods. In this respect, the following reference is incorporated by reference: D. E. Rumelhart and J. L. McClelland, *Parallel Distributed Processing: Explorations in the Microstructure of Cognition*, Vol. 1–2, M.I.T. Press (1986).

Having determined the linear summation, the unit 500 applies a sigmoid function (also called an "activation function"), as shown by the box 510 and Equation 6 (below).

$$o = g(h) = \left[ \frac{1}{1 + e^{-h}} \right] \quad [6]$$

where:

h is the linear summation;

o is the output; and g(h) is the sigmoid function with the operand being the h, linear summation.

3. External Information

Unlike the system 100 (FIG. 1), the system 200 may in one implementation consider certain "external information", such as partition information. This information may be used in applications such as the completion of data forms, where an application processor 207 recognizes the context in which input characters are being entered, and accordingly provides the external information about the characters. For example, in a form where one field requires a Social Security Number, the application processor 207 recognizes in advance that all input characters in this field must be digits, and accordingly provides this data as "external information" to a network selector 205, the operation of which is discussed below. Similarly, if a form field requires entry of a surname, the application processor 207 recognizes in advance that the first input character is an upper-case character and all remaining characters are mixed-case characters, and provides this data as external information.

Multiplier & Candidate Selector

The outputs of the networks 204/206 are combined by a multiplier 208, which effectively weights the specialized networks' outputs in accordance with the pre-classifier's output. Each weighted output, called a "confidence value" represents an estimated probability that an associated target character correctly represents the input character. The confidence values and associated target characters are then directed to a candidate selector 210, which assembles and orders them. The candidate selector 210 may also limit the output to a preselected group, such as the top ten most likely target characters.

Preferably, the candidate selector 210 first pools all target characters supplied by the specialized networks 206; as described below, however, output from certain specialized networks may be inapplicable if so determined by the network selector 205. After pooling the target characters from the specialized networks 206, the candidate selector 210 individually sorts the target characters according to their confidence values. Next, the candidate selector 210 returns a ranked list of some or all target characters. The list of returned target characters, for example, may be limited to a number of top candidates specified by a user.

Network Selector

In contrast to the system 100 (FIG. 1), the system 200 includes a network selector 205. The network selector 205 receives the output of the pre-classifier 204 on an input line 205a, and receives external information from the application processor on a line 205b.

Using this input data, the network selector 205 disables the output of one or more of the specialized networks 206 whose groups are found by the pre-classifier 204 to be especially unlikely. The specialized networks 206 with disabled outputs may be called "inactive" networks, with the remaining networks 206 being referred to as "active" networks.

Generally, all specialized networks 206 in the system 200 are invoked to compute the fine evaluation. However, target characters with the highest confidence values will originate from specialized networks 206 associated with groups found by the pre-classifier 204 to be most likely. Hence, it is not always necessary to invoke the specialized networks 206 whose corresponding output values from the pre-classifier 204 are low. For instance, if the pre-classifier 204 determines that the input character is probably not a digit, output from the digit specialized network 206c may ignored or temporarily disabled.

As an alternative to the illustrated embodiment 200, the network selector 205 may be incorporated within the pre-classifier 204. In this embodiment, the pre-classifier 204 receives external information on an input line 204a, and uses this information to aid in selectively disabling any specialized networks 206 when needed.

HARDWARE IMPLEMENTATION

The computational components of the systems 100 and 200 may be implemented in a number of different ways. Generally, as discussed below, the components of the systems 100/200 (except the transducer 102/202) may be implemented using digital processors and/or integrated circuits. The hardware implementation is preferably designed to accommodate the user's desired character recognition rate with minimum expense. In this respect, as one example, user's requirements may be grouped into low, medium, and high performance classes. For low performance requirements, of about 50 characters per second, the systems 100/200 may employ a personal computer such as a Pentium® or 486® based machine. For medium performance requirements of about 200 characters per second, the systems 100/200 may employ a mid-range computer such as a Power PC® or RISG-6000® based machine. For high performance classes, of about 1,000 characters per second, a mid-range computer may be employed along with a special purpose, programmable-weight neural network integrated circuit to implement the more computationally intensive components such as the networks 104/106 and 204/206.

OPERATIONAL SEQUENCE

Generally

Figure 7:
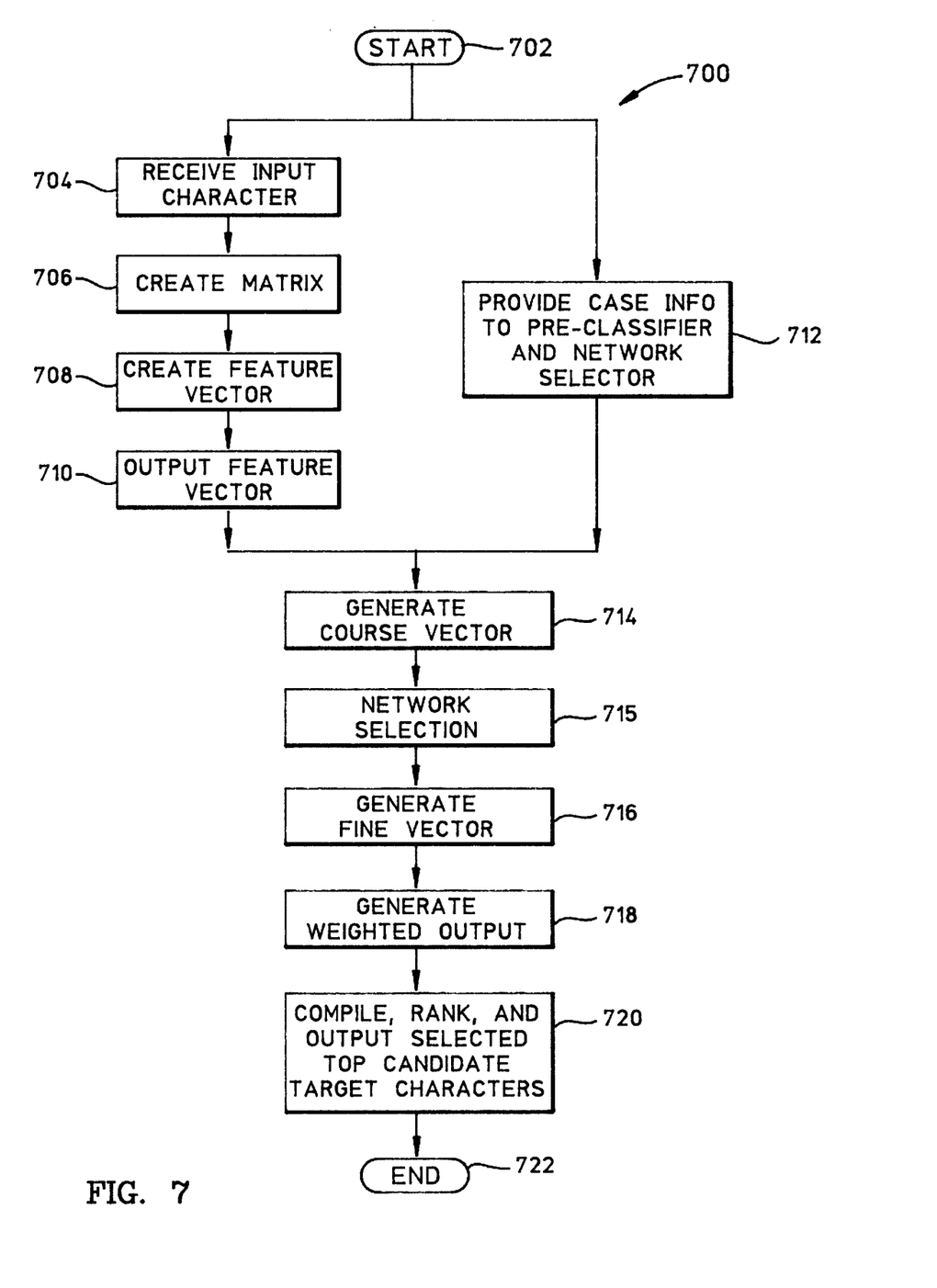
FIG. 7 is a general flowchart depicting an overall process for character recognition pursuant to the invention.

In addition to the hardware components described above, another aspect of the present invention comprises a character recognition method. To illustrate an example of this method, reference is made to an exemplary sequence of tasks 700 (FIG. 7). For ease of explanation, the routine 700 is described in the context of the system 200 (FIG. 2). After the routine begins in task 702, the transducer 202 receives the input character 201 in task 704. In the illustrated embodiment, this is performed by inputting a sheet of paper or other tangible media into a digitizing optical scanner, or by using a special pen to trace a pattern on a digitizing pad. In task 706, the transducer 202 outputs a machine-readable matrix, such as a bit map, representing the appearance of the input character.

Then, in task 708 the feature extractor 203 receives the matrix and extracts certain selected characteristics, as discussed above, to generate a feature vector. The feature extractor 203 in task 710 directs its feature vector to the pre-classifier 204 and the specialized networks 206. Concurrently with tasks 704–710, certain external information may be supplied to the pre-classifier 204 or network selector 205 in task 712. As illustrated, the external information originates from an application processor 207, which obtains the external information from an application program that provides a structure, such as a predefined form, for receiving the input characters.

After tasks 710 and 712 complete, tasks 714–716 are performed. In task 714, responsive to the feature vector, the pre-classifier 204 generates the coarse vector, estimating probabilities that the input character belongs to each one of multiple groups of characters. The character groups may be established, for example, as shown in Table 1 described above. In tasks 715–716, certain specialized networks 206 generate respective fine vectors estimating probabilities that the input character represents individual ones of multiple characters in the specialized networks' own group of characters. These certain specialized networks are selected by the network selector 205 in task 715 to boost the computational speed of the system 200. In particular, the network selector 205 in task 715 selectively disables any specialized networks 206 whose character groups probabilities fall below a pre-established threshold. This determination may be made in response to (1) the coarse vector of the soft pre-classifier 204 (determined via Equation 3 discussed above), and (2) the external information from the application processor 207. The disabled networks 206 are called "inactive" networks, and the other networks 206 are "active" networks. The operation of the network selector 205 is discussed in greater detail below.

After task 716, the multiplier 208 in task 718 weights each specialized network's output signal in proportion to the corresponding soft pre-classifier outputs, providing a number of multiplier output lists, each comprising an estimate of individual probabilities that the input character corresponds to characters of the defined character groups. Namely, each multiplier list includes a list of target characters from one group, and a corresponding confidence values for each target character.

After task 718, the candidate selector 210 in task 720 combines and orders the multiplier output lists to provide a list of target characters ranked by confidence value. Furthermore, the list may be limited according to a selected criteria, such as a certain finite number of top candidates. Finally, the routine 700 ends in task 722.

Network Selection

1. Generally

All specialized networks 206 in the system 200 may be invoked to perform fine evaluations, each generating a respective fine vector. The chief interest in classification, however, concerns a few top outputs. In other words, the most likely target characters will originate from specialized networks 206 associated with groups found by the pre-classifier 204 to be particularly likely; thus, it is unnecessary to invoke the unlikely specialized networks whose corresponding output values from the pre-classifier 204 are low.

For instance, if the pre-classifier 204 determines that the input character is not likely to be digit, output from the digit specialized network 206c may ignored; alternatively, the network 206c may be temporarily disabled.

This selective invocation does not affect the recognition accuracy because categories from the inactive networks are unlikely to be among the few top values. However, this procedure significantly reduces the computational requirement of the system 200.

2. Decision Logic

The selective invocation of networks 206 by the network selector 205 may be referred to as "decision logic." The decision logic takes into account the external information as well as the pre-classifier's output values. The sequence 600 (FIG. 6) illustrates an example of the decision logic. Basically, the function of the sequence 600 is selection: the sequence 600 selects one or more specialized networks 206 to become the "active" networks.

Figure 6:
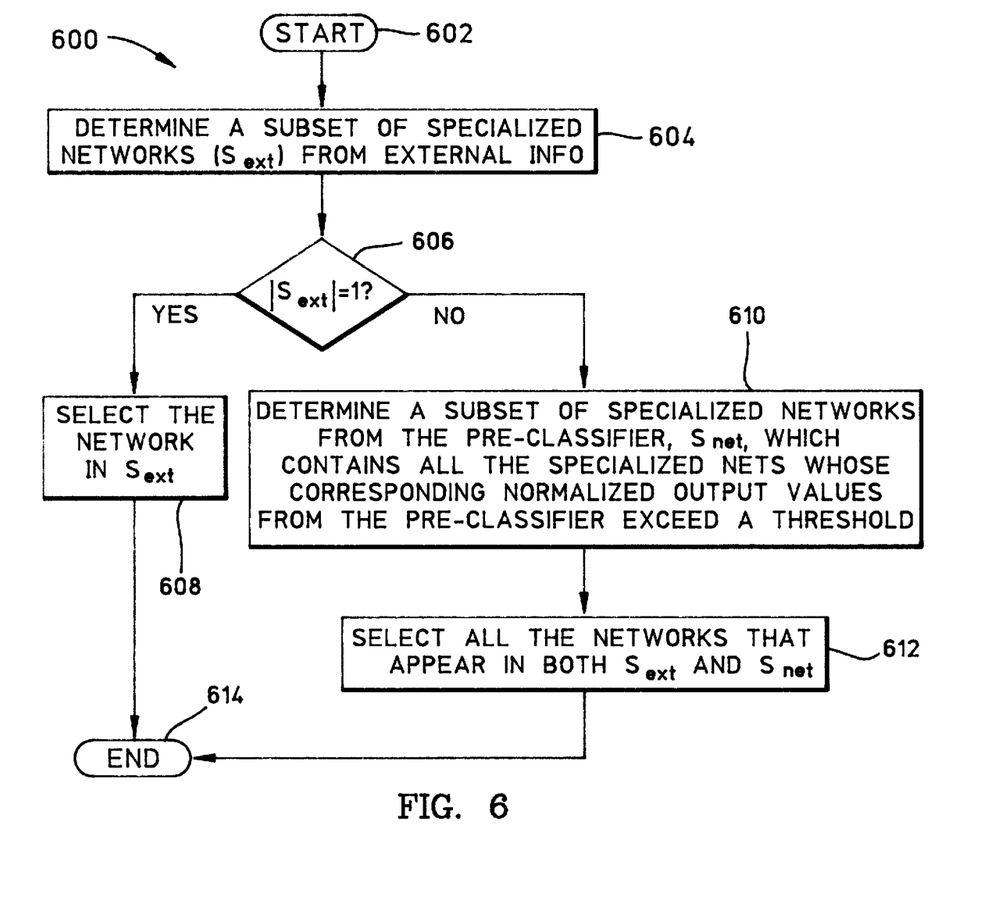
FIG. 6 is a flowchart depicting a sequence for network selection pursuant to the invention.

After the routine 600 begins in task 602, task 604 uses the external information to identify a "subset" of the applicable specialized networks 206. For instance, if the external information indicates that the input character occurs in a digit-specific field, the subset of applicable specialized networks will be the network 206c. This subset is referred to as an external subset ($S_{ext}$).

Next, query 606 asks whether the external subset only contains a single one of the networks 206. If so, the network selector 205 selects this network in task 608, and the routine 600 ends in task 614. In this case, the pre-classifier 204 is effectively bypassed, and the set of target characters is selected solely upon the network 206 identified by the external subset.

However, if the external subset contains multiple networks 206, task 610 attempts to possibly narrow the field of potential networks 206. Task 610 does this by determining a pre-classifier subset ($S_{net}$) of specialized networks 206 including all specialized networks whose corresponding normalized output values from the pre-classifier exceed a certain threshold. In particular, a given specialized network 206 is selected in task 610 only if that network satisfies Equation 7, below:

$$p_i/max\{p_1, p_2, \ldots, p_c\} \geq t \qquad [7]$$

where:

$p_i$ (i=1, 2, ..., c), are the output values of the pre-classifier 204; and t is a threshold controlling the number of specialized networks 206 being invoked per input character.

In other words, the pre-classifier subset is determined by first reading all four outputs of the pre-classifier 204, and normalizing all four outputs to the maximum output value. An exemplary set of pre-classifier outputs is shown in Table 2, below.

TABLE 2

| Exemplary Pre-Classifier Outputs | |
|---|---|
| OUTPUT | PRE-CLASSIFIER OUTPUTS, NOT NORMALIZED |
| 1 | 0.1 |
| 2 | 0.1 |
| 3 | 0.2 |
| 4 | 0.6 |

In this example, all values are normalized to 0.6 by dividing them by 0.6. Accordingly, the normalized values occur as shown in Table 3, below.

TABLE 3

Exemplary Normalized Pre-Classifier Outputs

| OUTPUT | PRE-CLASSIFIER OUTPUTS, NORMALIZED |
| --- | --- |
| 1 | 0.167 |
| 2 | 0.167 |
| 3 | 0.333 |
| 4 | 1.0 |

Then, the pre-classifier subset is established by determining which outputs of the pre-classifier exceed the threshold. The threshold (t, in Equation 7) is preferably determined experimentally. Preferably, where the normalized pre-classifier output signals range between zero and one, this threshold is about 0.2. In the illustrated example of Tables 2–3, the pre-classifier subset would be chosen to include the third and fourth outputs, i.e. the specialized networks 206c–206d.

Having established the pre-classifier subset ($S_{net}$) and the external subset ($S_{ext}$) in task 610, task 612 selects all specialized networks 206 appearing in both the pre-classifier and external subsets, and the routine ends in task 614.

3. Threshold Determination

As mentioned above, the threshold may be established experimentally. One important performance measure for the network selector 205 is the "case coverage" (or "coverage rate"), defined as the percentage of input characters for which the correct specialized network is selected by the network selector 205.

Figure 9:
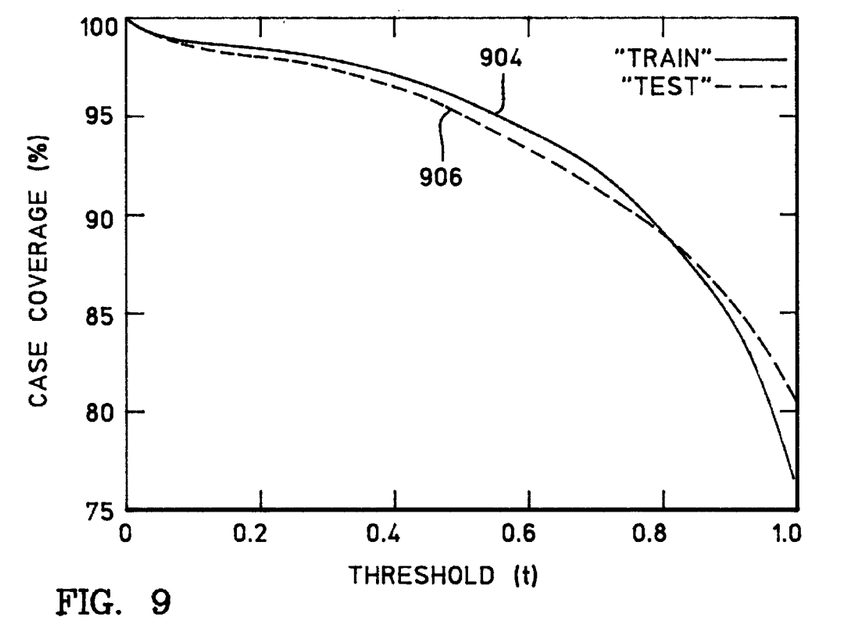
FIG. 9 is a plot of coverage rate determining threshold in accordance with the invention.
Figure 10:
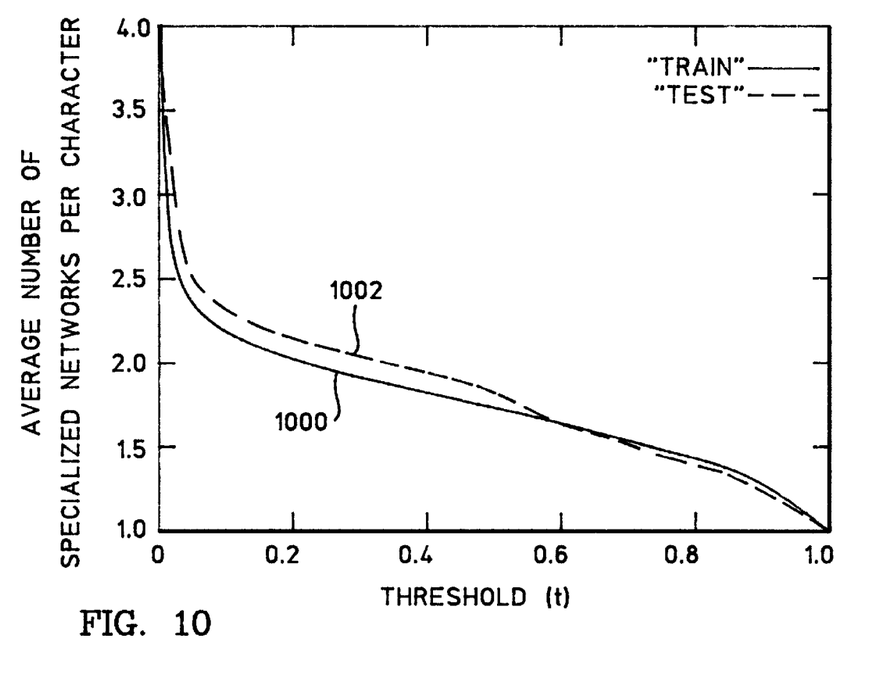
FIG. 10 is a plot of average number of specialized networks per character for determining threshold in accordance with the invention.

FIGS. 9–10 depict certain experimental data, used to illustrate experimental determination of the threshold. In this example, the specialized networks 206a–206c were trained using a NIST training database and a set of "bad splits" and touching characters. This database is explained in R.A. Wilkinson and J. Geist, et al., *The First Census Optical Character Recognition System Conference*, U.S. Dept. of Commerce, NISTIR 4912 (1992), hereby incorporated by reference. The specialized network 206d was trained with a training set containing 7083 patterns. The "bad splits" and touching characters were obtained from a segmenter for use as "negative training samples. In this respect, explanation is provided in R.G. Casey and &. Takahashi, *Experience in Segmenting and Recognizing the NIST Database*, Proc. Intl. Workshop on Frontiers of Handwriting (1991), hereby incorporated by reference. In this example, the pre-classifier was trained using a subset, including 63,277 characters, of the pooled data that contains all data used for training the specialized networks 206. The test data included the NIST database (S07), containing 11,941 uppercase characters, 12,000 lower-case characters, 58,646 digits, and a total of 14,459 special symbols.

FIG. 9 shows a plot of case coverage versus a linearly increasing threshold (t). The curve 904 represents case coverage results for ideal training data, and the curve 906 represents case coverage results for actual test data. In both cases, as the threshold decreases, the case coverage increases. When the threshold is zero, of course, the case coverage is 100%, and conversely when the threshold is one, the case coverage approaches 0%. If a threshold less then 0.5 is chosen, the case coverage is greater than 95%.

Preferably, the threshold is not selected based upon case coverage alone, however. The choice of the threshold value also affects the system's recognition speed. FIG. 10 shows a plot of the average number of networks being invoked per character versus the threshold (t). The curve 1000 represents ideal training data, and the curve 1002 represents results for actual test data. Generally, the average number of networks used decreases from four to one as the threshold increases from zero to one. Therefore, if a threshold greater than 0.1 is selected, less than 2.3 specialized networks per character on average will be invoked.

From FIGS. 9–10, then, it is seen that a threshold value of 0.2 is advantageous, providing case coverage of at least 97% and invoking about 2 specialized networks on average. This provides an increase in computational speed of at least 1.3 with respect to known single-stage multi-network systems.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

For example, skilled artisans having the benefit of this disclosure will recognize that the two-stage multi-network classification system is appropriate for many different classification problems. This system may be especially useful for tasks that present a large number of categories, as in Chinese or Kanji text, or classification problems in large computer databases. Moreover, this system may be appropriate for any general purpose OCR system. Additionally, the combination system may be implemented for combining results from multiple known classifiers for other applications.

Figure 8:
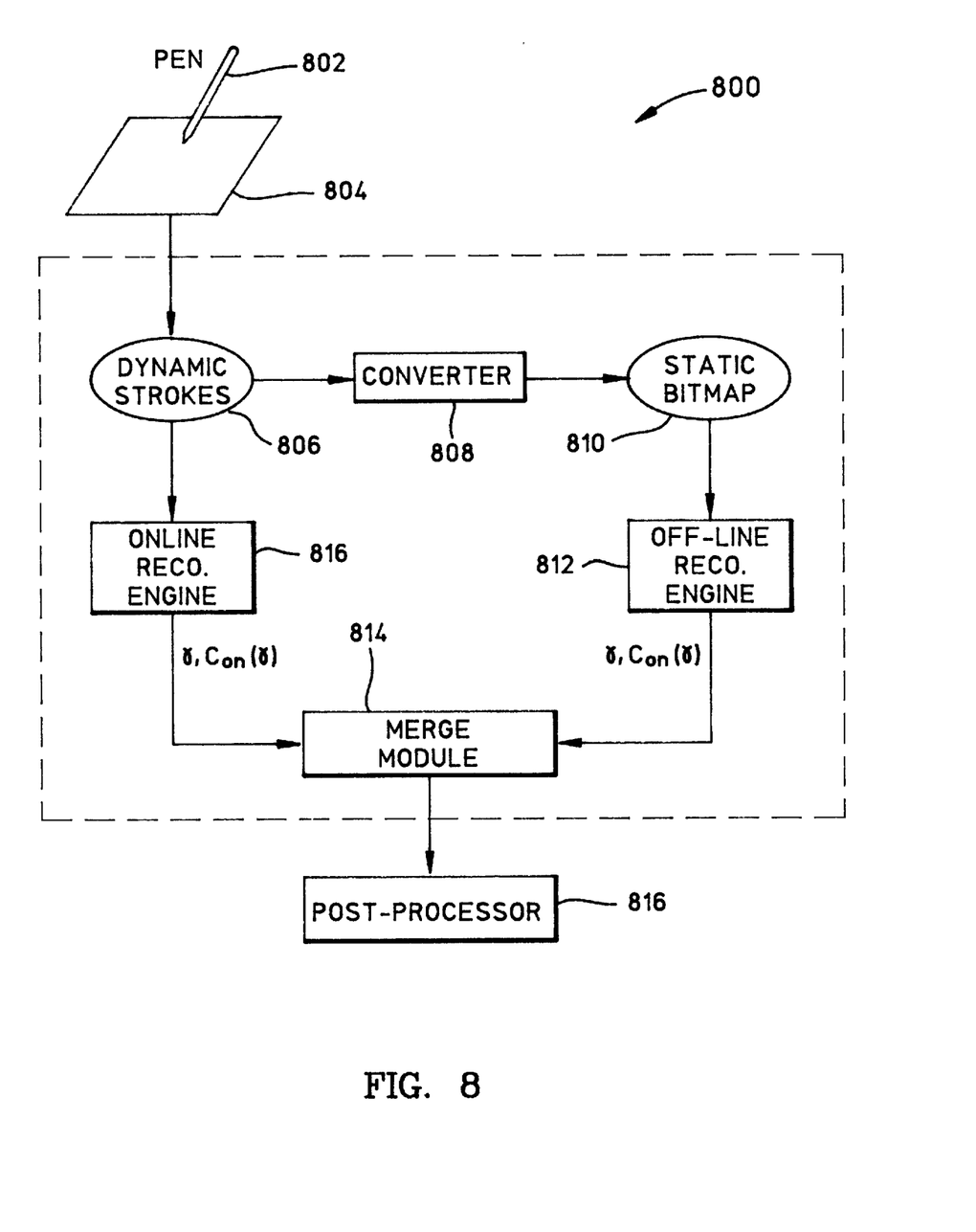
FIG. 8 is a block diagram illustrating a dual-mode character recognition system pursuant to the invention.

Furthermore, the invention may be advantageously applied in a "dual-mode" character recognition system, including on-line and off-line processing components. Generally, on-line recognition engines offer better recognition accuracy than the off-line engines. However, the on-line approach is sensitive to user-dependent letter formation, such as the order of the formation and the number of constituent strokes. On the other hand, the off-line approach is independent of the letter formation. FIG. 8 illustrates a dual-mode character recognition system 800 that combines the advantages of on-line and off-line character recognition approaches.

The system 800 includes a pen 802 and a digitizing pad 804, for a user to enter handwritten input characters. The pad 804 creates a machine-readable record 806 indicative of the user's dynamic pen strokes. The record 806 is directed to an on-line recognition engine 816 and a converter 808.

The engine 816, for example, may comprise an IBM Thinkpad® product running the Personal Assistant® software. The on-line recognition engine 816 preferably uses elastic template matching to generate a list of target character candidates and associated confidence values, considering the dynamic aspect of the record 806, e.g. direction, speed, order, path of pen movement, pen-down, pen-up, etc. In the illustrated example, confidence values comprise a rating between zero and one; another range may be used, however, such as between zero and 99. Characters that do not appear in the on-line engine's list have a confidence value of zero.

The converter 808 converts the dynamic record 806 into a static bit map 810, indicative of the appearance of the user's input character. In this respect, the converter 808 may operate as described in U.S. patent application Ser. No.

08/061,495, filed on May 5, 1993, entitled "Hybrid On-Line Handwriting Recognition and Optical Character Recognition System" and assigned to IBM Corporation, this application being hereby incorporated by reference.

The static bitmap 810 is input to an off-line recognition engine 812, which preferably comprises a multi-network character recognition system such as the system 200 (FIG. 2). The engine 812, like the engine 816, provides an output of target character candidates and associated confidence values. As with the engine 812, characters that do not appear on the off-line engine's list have a confidence value of zero.

The candidates from the engines 816/812 are combined by a merge module 814, which pools and then re-ranks the candidates. Namely, the merge module 814 uses the on-line and off-line confidence values of each character to determine a new combined confidence value. The generation of each character's combined confidence values may be performed, for example, as shown in Equation 8, below.

$$C(\gamma)=C_{on}(\gamma)+C_{off}(\gamma)+ACMA_{on}(\beta,\gamma)+ACM_{off}(\beta,\gamma) \qquad [8]$$

where:

$\gamma$=a candidate character;

C ($\gamma$)=the new confidence value for the character $\gamma$;

$C_{off}$=the confidence value provided by the off-line recognition engine 812;

$C_{on}$=the confidence value provided by the on-line recognition engine 816;

$ACM_{on}(\alpha,\gamma)$=an additive confusion matrix entry corresponding to $\gamma$ and $\alpha$, the off-line engine's top-ranked candidate; and $ADM_{off}(\beta,\gamma)$=the additive confusion matrix entry corresponding to $\gamma$ and $\beta$, the off-line engine's top-ranked candidate.

The generation of the additive confusion matrices is described in greater detail, as follows. The on-line engine 816 and the off-line engine 812 return respective candidate lists $S_{on}$ and $S_{off}$, shown in decreasing order in Equations 9–10, below.

$$S_{on}=\{\alpha_1,\alpha_2,\ldots,\alpha_m\} \qquad [9]$$

$$S_{off}=\{\beta_1,\beta_2,\ldots,\beta_n\} \qquad [10]$$

In addition to the candidates (for "target characters"), the engines 816/812 each return a confidence value for their respective candidates, i.e., $C_{on}(\gamma)$ or $C_{off}(\gamma)$. If a character $\gamma$ is not in an engine's candidate list, the corresponding confidence value, $C_{on}(\gamma)$ or $C_{off}(\gamma)$ is zero.

The additive confusion matrices $ACM_{on}$ and $ACM_{off}$ are constructed from confusion matrices $CM_{on}$ and $CM_{off}$ formed from a common training data set. Each element of a confusion matrix is identified by two coordinates, including an actual input character (a "candidate", $\gamma$), and a target character ($\alpha$ or $\beta$) generated by the on-line 816 or off-line 812 engine, respectively. In the case of the on-line confusion matrix ($CM_{on}$), the value of an element having coordinates ($\gamma,\alpha$) represents the frequency that the on-line engine 816 recognizes input characters from the category $\gamma$ as being in the target category $\alpha$.

The additive confusion matrices, $ACM_{on}$ and $ACM_{off}$, are prepared from the confusion matrices, $CM_{on}$ and $CM_{off}$, as follows. Each element of the respective confusion matrices is increased by one, the logarithm of that element is taken, and the resulting values are scaled to the same range used in the elements of the confusion matrices, e.g. from zero to one or 1–99.

After the merge routine 814, the post-processor routine 816 sorts the pooled candidate list according to the new (combined) confidence values, and returns a ranked list of some or all target characters.

What is claimed is:

1. A character recognition system, comprising:
   a soft pre-classifier responsive to a representation of an input character to provide a first output signal comprising a coarse vector estimating probabilities of the input character belonging to each one of multiple predefined groups of recognized target characters;
   for each particular group of target characters, a specialized neural network to receive the input character and provide a second output signal comprising a fine vector estimating probabilities of the input character representing each one of multiple target characters in the particular group of target characters;
   a multiplier, coupled to the soft pre-classifier and each of the specialized neural networks, to weight each specialized neural network's second output signal in proportion to the first output signal to provide multiplier output lists, each multiplier list including a list of target characters each associated with a confidence value indicating a probability that the associated target character correctly represents the input character; and
   a candidate selector, coupled to the multiplier, to compile and rank contents of the multiplier output lists and provide an aggregate list of target characters and associated confidence values.

2. The character recognition system of claim 1, the aggregate list of target characters being ordered according to their confidence values.

3. The character recognition system of claim 1, the aggregate list being limited to target characters having a number of the highest confidence values.

4. The character recognition system of claim 1, the aggregate list being limited to target characters having confidence values exceeding a predetermined threshold.

5. The character recognition system of claim 1, the soft pre-classifier comprising a feedforward neural network to perform probability calculations to identify one group of target characters that the input character most likely belongs to.

6. The character recognition system of claim 1, each specialized neural network comprising a feedforward neural network to perform probability calculations to identify a target character in a particular group of characters that the input character most likely represents.

7. The character recognition system of claim 1, each of the multiple groups of target characters including non-overlapping sets of target characters.

8. The character recognition system of claim 1, the multiple groups of target characters including partially overlapping sets of characters.

9. The character recognition system of claim 1, the multiple groups of target characters including: a group of lower-case characters, a group of upper-case characters, a group of digits, and a group of special symbols.

10. The character recognition system of claim 1, further including a transducer coupled to the soft pre-classifier to receive the input character and provide the representation of the input character, said representation comprising a bit map.

11. The character recognition system of claim 10, the transducer comprising a digital optical scanner.

12. The character recognition system of claim 10, the transducer comprising a pen and an associated digitizing pad.

13. The character recognition system of claim 10, further including a feature extractor interposed between the transducer and the soft pre-classifier.

14. The character recognition system of claim 1, further comprising:
- a transducer to receive a tangible medium bearing the input character and create a machine-readable matrix representative of the input character; and
- a feature extractor, coupled between the transducer and the soft pre-classifier, responsive to the matrix to generate a feature vector containing representations of selected characteristics of the input character.

15. The character recognition system of claim 14, the transducer comprising a digitizing optical scanner.

16. The character recognition system of claim 14, the transducer comprising a pen and an associated digitizing pad.

17. The character recognition system of claim 14, the feature extractor comprising a mechanism responsive to the matrix to generate a feature vector containing representations of characteristics including contour direction features of the input character.

18. The character recognition system of claim 14, the feature extractor comprising a mechanism responsive to the matrix to generate a feature vector containing representations of characteristics including bending point features of the input character.

19. The character recognition system of claim 1, the soft pre-classifier including a first input to receive an external information signal associating the input character with one or more specialized neural networks, a second input to receive the representation of the input character, and a network selector responsive to the first output signal and the external information signal to select all specialized neural networks identified by the external information signal and all specialized neural networks whose component of the first output signal exceeds a predetermined threshold.

20. The character recognition system of claim 19, the network selector further including circuitry to deactivate all specialized neural networks not selected.

21. The character recognition system of claim 1, further including a network selector including a third input to receive the first output signal from the soft pre-classifier, a fourth input to receive an external information signal associating the input character with one or more specialized neural networks, and circuitry responsive to the first output signal and the external information signal to select all specialized neural networks identified by the external information signal and all specialized neural networks whose component of the first output signal exceeds a predetermined threshold.

22. The character recognition system of claim 21, the network selector inhibiting outputs of the selected specialized neural networks.

23. The character recognition system of claim 21, the network selector disabling outputs of the selected specialized neural networks.

24. The character recognition system of claim 1, further including a network selector including a third input to receive the coarse vector from the soft pre-classifier, the coarse vector including multiple components each estimating a probability that the input character belongs to a different one of the predefined groups of recognized target characters, a fourth input to receive external information associating the input character with one or more specialized neural networks, and circuitry programmed to select one or more specialized neural networks by performing steps comprising:
- selecting all specialized neural networks identified by the external information;
- normalizing the components of the coarse vector; and
- selecting all specialized neural networks whose normalized component of the coarse vector exceeds a predetermined threshold.

25. The character recognition system of claim 24, the network selector further being programmed to inhibit output of the selected specialized neural networks.

26. The character recognition system of claim 1, including a programmed digital data processing device to implement at least one of the pre-classifier, specialized neural networks, multiplier, and candidate selector.

27. The character recognition system of claim 1, further including a network selector including a third input to receive the coarse vector from the soft pre-classifier, the coarse vector including multiple components each estimating a probability that the input character belongs to a different one of the predefined groups of recognized target characters, a fourth input to receive external information associating the input character with one or more specialized neural networks, and circuitry programmed to select one or more specialized neural networks by performing steps comprising:
- selecting all specialized neural networks identified by the external information;
- normalizing the components of the coarse vector; and
- selecting all specialized neural networks whose normalized component of the coarse vector exceeds a predetermined threshold.

28. A method for character recognition, comprising the steps of:
- responsive to a representation of an input character, providing a first output signal comprising a coarse vector estimating probabilities of the input character belonging to each one of multiple groups of characters;
- responsive to the input character, providing multiple second output signals each corresponding to a particular group of characters and comprising a fine vector estimating probabilities of the input character representing each one of multiple characters in the particular group of characters;
- weighting each second output signal in proportion to the first output signal to provide multiplier output lists each comprising an estimate of individual probabilities that the input character corresponds to each of the characters of a different specialized neural network; and
- assembling and ranking contents of the multiplier output lists to provide individual ranked estimates according to a selected criteria.

29. The method of claim 28, the selected criteria comprising all individual ranked estimates.

30. The method of claim 28, the selected criteria comprising all individual ranked estimates exceeding a predetermined threshold.

31. The method of claim 28, the step of providing the first output signal comprising the steps of employing a feedforward neural network to perform probability calculations to identify a group of characters to which the input character most likely belongs.

32. The method of claim 28, the step of providing multiple second output signals comprising the steps of employing multiple feedforward neural networks each corresponding to a different group of characters, to perform probability calculations to identify a character in the corresponding group of characters that the input character most likely corresponds to.

33. The method of claim 28, each of the multiple groups including a non-overlapping set of characters.

34. The method of claim 28, at least two of the multiple groups including characters of overlapping sets.

35. The method of claim 33, the multiple groups including a first group of upper-case characters, a second group of lower-case characters, a third group of digits, and a fourth group of special symbols.

36. The method of claim 28, the step of providing the first output signal comprising the steps of receiving external information associating the input character with one or more specialized neural networks, receiving the representation of the input character, and responsive to the first output signal and the external information selecting all specialized neural networks identified by the external information and all specialized neural networks whose component of the first output signal exceeds a first predetermined threshold.

37. The method of claim 36, further comprising a step of deactivating the specialized neural networks not selected.

38. The method of claim 28, the weighting step comprising the steps of:

responsive to the first output signal, selecting second output signals having coarse estimates greater than a predetermined threshold; and weighting each selected second output signal in proportion to the first output signal to provide multiplier output lists each comprising an estimate of individual probabilities that the input character corresponds to characters of a different selected specialized neural network.

39. The method of claim 28, the step of providing multiple second output signals comprising the steps of, responsive to the first output signal and the input character, providing multiple second output signals each corresponding to a particular group of characters having coarse estimates greater than a predetermined threshold, each second output signal comprising a fine vector estimating probabilities of the input character representing each one of multiple characters in the particular group of characters.

40. The method of claim 28, the step of providing a first output signal comprising the steps of:

employing a transducer to receive a tangible medium bearing the input character and create machine-readable matrix representative of the input character;

utilizing a feature extractor responsive to the matrix to generate a feature vector containing representations of selected characteristics of the input character; and responsive to the feature vector, providing a first output signal comprising a coarse vector estimating probabilities of the input character belonging to each one of multiple groups of characters.

41. The method of claim 40, the employing step being performed by operating a digitizing optical scanner to optically scan the tangible medium and create a machine-readable matrix representative of the input character.

42. The method of claim 40, the selected characteristics including contour directions of the input character.

43. The method of claim 40, the selected characteristics including bending point features of the input character.

* * * * *